US009991527B2

(12) United States Patent
Nakata et al.

(10) Patent No.: US 9,991,527 B2
(45) Date of Patent: Jun. 5, 2018

(54) HEAT EXCHANGER, METHOD OF PRODUCING HEAT EXCHANGER, AND FUEL CELL SYSTEM

(71) Applicant: Panasonic Intellectual Property Management Co., Ltd., Osaka (JP)

(72) Inventors: Hideki Nakata, Kyoto (JP); Kunihiro Ukai, Nara (JP); Masakazu Aoki, Shiga (JP); Norio Katsushita, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 146 days.

(21) Appl. No.: 15/130,940

(22) Filed: Apr. 16, 2016

(65) Prior Publication Data

US 2016/0322652 A1 Nov. 3, 2016

(30) Foreign Application Priority Data

Apr. 28, 2015 (JP) ................. 2015-091245

(51) Int. Cl.
*H01M 8/04* (2016.01)
*H01M 8/12* (2016.01)
(Continued)

(52) U.S. Cl.
CPC ........ *H01M 8/04074* (2013.01); *F28D 9/005* (2013.01); *F28D 9/0056* (2013.01);
(Continued)

(58) Field of Classification Search
CPC .... F28D 1/0316; F28D 1/0358; F28D 1/0383; F28D 1/0475; F28D 7/1669; F28D 9/0056

See application file for complete search history.

(56) References Cited

U.S. PATENT DOCUMENTS 2,340,138 A * 1/1944 Morris ................. F28D 7/0083
159/28.2
2,819,882 A * 1/1958 Stephani .................. F22D 1/32
165/140
(Continued)

FOREIGN PATENT DOCUMENTS

| FR | 2855602 | 12/2004 |
| JP | 2006-010130 | 1/2006 |
| JP | 2013-211202 | 10/2013 |

OTHER PUBLICATIONS

The Extended European Search Report dated Sep. 19, 2016 for the related European Patent Application No. 16165553.5.

*Primary Examiner* — Matthew J Merkling
(74) *Attorney, Agent, or Firm* — McDermott Will & Emery LLP

(57) ABSTRACT

A heat exchanger, in which heat is exchanged between first and second mediums, includes a housing that includes a first inlet and a first outlet, an internal member that divides a space in the housing into first and second chambers, and first and second external channels, through which the first medium flows, in the respective first and second chambers. The internal member includes a diverging hole that divides the first medium into flows through the first and second external channels, a converging hole that allows the divided first medium to converge, a second inlet, a second outlet, and an internal channel through which the second medium flows. The first and second external channels each include a first bent portion bent inwardly at a peripheral portion of the first or second chamber. The internal channel includes a second bent portion bent inwardly at a peripheral portion of the internal member.

4 Claims, 9 Drawing Sheets

(51) Int. Cl.
 *F28D 9/00* (2006.01)
 *H01M 8/04007* (2016.01)
 *H01M 8/04014* (2016.01)
 *F28D 21/00* (2006.01)

(52) U.S. Cl.
 CPC ......... *H01M 8/04014* (2013.01); *H01M 8/12* (2013.01); *F28D 2021/0043* (2013.01)

(56) References Cited

U.S. PATENT DOCUMENTS

| | | | | |
|---|---|---|---|---|
| 4,561,496 A | * | 12/1985 | Kehrer | C01C 1/0452 122/412 |
| 6,276,442 B1 | * | 8/2001 | Rasmussen | F28B 1/02 165/110 |
| 7,384,539 B2 | * | 6/2008 | Witte | B01J 19/0013 165/172 |
| 2016/0097596 A1 | * | 4/2016 | Stewart | F28D 1/0233 165/175 |

\* cited by examiner

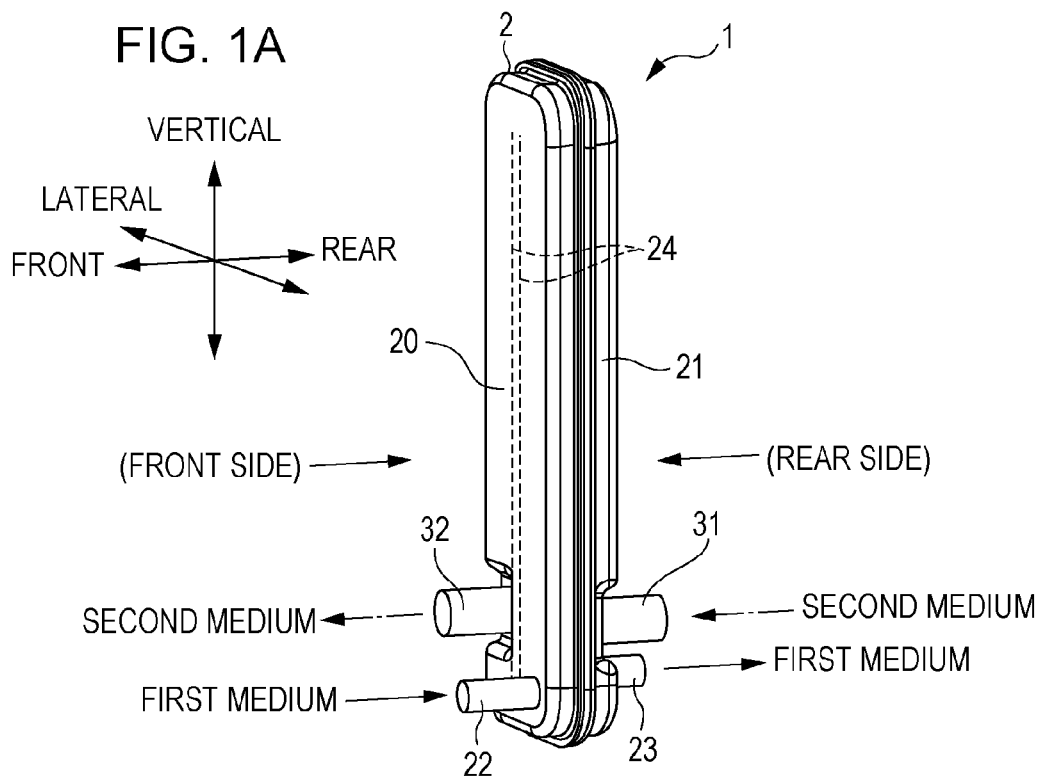
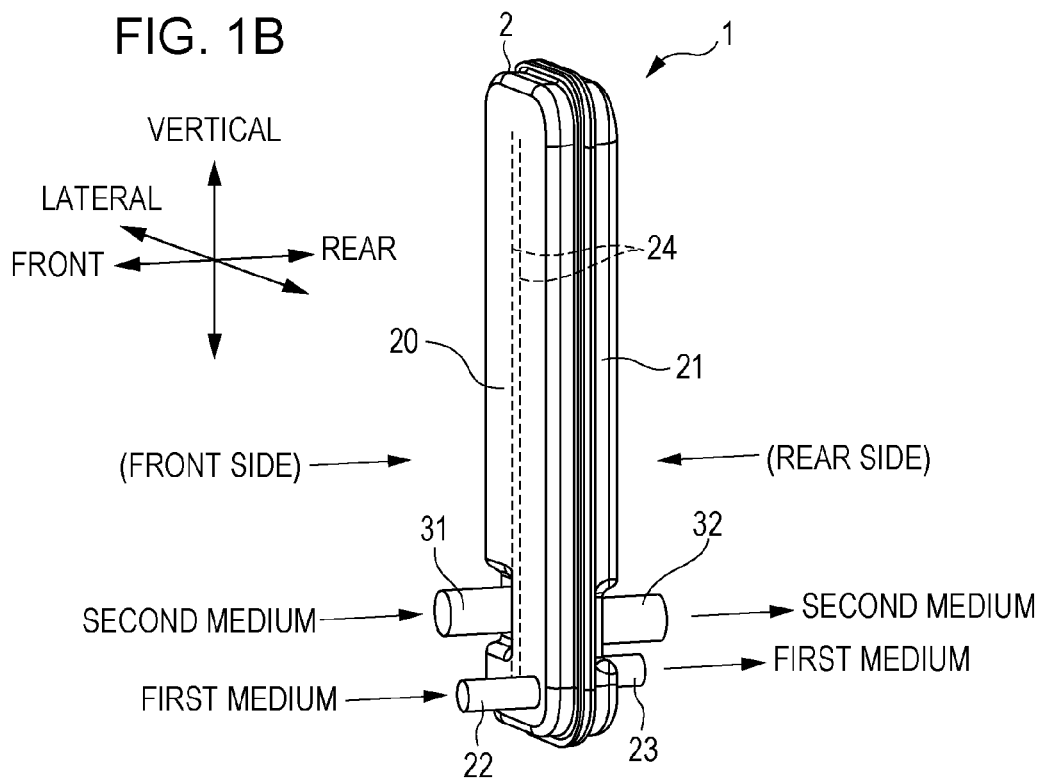

HEAT EXCHANGER, METHOD OF PRODUCING HEAT EXCHANGER, AND FUEL CELL SYSTEM

BACKGROUND

1. Technical Field

The present disclosure relates to a heat exchanger for heat exchange between mediums having different levels of thermal energy, a method of producing the heat exchanger, and a fuel cell system.

2. Description of the Related Art

Heat exchangers such as a plate heat exchanger and a double pipe heat exchanger are traditionally used to exchange heat between two fluids (mediums) having different levels of thermal energy.

The technology of the heat exchanger is applied to a heat exchanger that is disposed in a fuel cell unit, for example. The heat exchanger disposed in the fuel cell unit heats an oxidant gas, which is used for power generation reaction in the cell, with heat of a combustion gas generated by combusting unused gas that is not used in the power generation (see Japanese Unexamined Patent Application Publication No. 2013-211202, for example).

The heat exchanger disclosed in Japanese Unexamined Patent Application Publication No. 2013-211202 includes an oxidant gas channel through which the oxidant gas to be heated flows, a plurality of guide plates that allow the oxidant gas to flow in a serpentine shape, an oxidant gas inlet member through which the oxidant gas enters the heat exchanger, and a plurality of oxidant gas outlet members through which the oxidant gas is supplied to a fuel cell assembly. The heat exchanger further includes an opening, which limits the flow of the oxidant gas, at a downstream end of the oxidant gas channel, which is positioned downstream of the guides. The distances between the opening and the oxidant gas outlet members are equal. With this configuration, the heat exchanger having the oxidant gas channel extending in the serpentine shape allows the oxidant gas to be equally supplied to each fuel cell.

SUMMARY

One non-limiting and exemplary embodiment provides a heat exchanger that is produced at a low cost and reduced in size, a method of producing the heat exchanger, and a fuel cell system.

In one general aspect, the techniques disclosed here feature a heat exchanger including a hollow housing including a first inlet member through which a first medium flows into the housing and a first outlet member through which the first medium flows out of the housing, an internal member disposed in the housing such that a space in the housing is divided into a first chamber and a second chamber, and a first external channel in the first chamber and a second external channel in the second chamber. The first external channel and the second external channel are in communication with the first inlet member and the first outlet member, respectively, such that the first medium flows through the first external channel and the second external channel. The internal member includes a diverging hole that divides the first medium flowing from the first inlet member into a flow flowing through the first external channel and a flow flowing through the second external channel, a converging hole that allows the divided first medium to converge, a second inlet member through which a second medium flows into the housing, a second outlet member through which the second medium flows out of the housing, and an internal channel that is in communication with the second inlet member and the second outlet member such that the second medium flows through the internal channel. The first external channel and the second external channel each include a first bent portion at which the first external channel and the second external channel are bent inwardly at a peripheral portion of each of the first chamber and the second chamber. The internal channel includes a second bent portion at which the internal channel is bent inwardly at a peripheral portion of the internal member. Heat is exchanged between the first medium, which flows through the first external channel and the second external channel, and the second medium, which flows through the internal channel.

In a heat exchanger, a method of producing the heat exchanger, and a fuel cell system according to aspects of the present disclosure, advantages of the reductions in cost and size are achieved.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 1A is a perspective view illustrating an example of an external configuration of a heat exchanger according to an embodiment;

FIG. 1B is a perspective view illustrating an example of an external configuration of the heat exchanger according to the embodiment;

DETAILED DESCRIPTION

Figure 2:
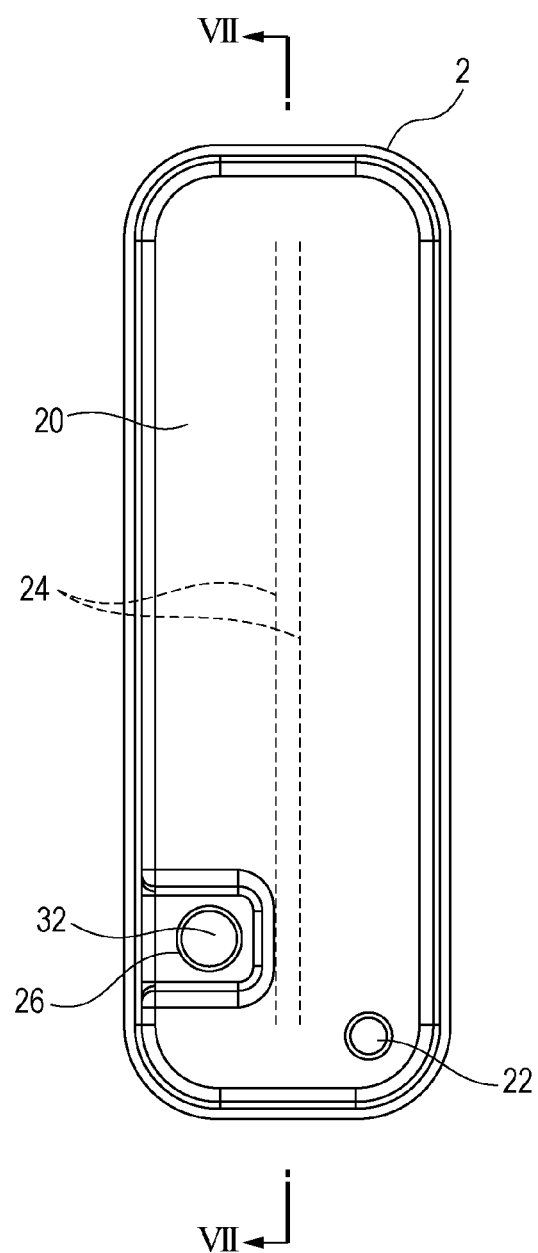
FIG. 2 is a front view illustrating an example of the external configuration of the heat exchanger illustrated in FIG. 1A.

Underlying Knowledge Forming Basis of the Embodiment of the Present Disclosure The inventors conducted a comprehensive study on the heat exchanger described in Japanese Unexamined Patent Application Publication No. 2013-211202, which is discussed in "Background", and noticed that the heat exchanger includes linear combustion gas pipes through which the combustion gas flows. The inventors found that the heat exchanger having such a configuration requires long combustion gas pipes in order to improve heat exchange performance between the combustion gas and an electric power generating air, preventing a reduction in the size of the heat exchanger.

The heat exchanger includes a plurality of guide plates in an electric power generating air channel such that the electric power generating air flows in the serpentine shape. The plurality of guide plates are required as separate components in the electric power generating air channel, and as a result, the production cost increases. In addition, a flow path of the combustion gas is constituted by a plurality of combustion gas pipes. This configuration requires preparation of the plurality of combustion gas pipes, and as a result, the production cost increases.

In addition, the inventors found that, in the heat exchanger described in Japanese Unexamined Patent Application Publication No. 2013-211202, a flow rate of the combustion gas flowing through the combustion gas pipe per unit time needs to be increased in order to improve the heat exchange performance between the combustion gas and the electric power generating air. This increases pressure loss in the combustion gas pipe. Furthermore, the inventors found that a certain flow rate is required for uniform flow of the electric power generating air in the electric power generating air channel. This increases pressure loss in the electric power generating air channel. An auxiliary machine such as a compressor may be required to cause the combustion gas and the electric power generating air to flow through the power generating channel, and as a result, the production cost increases.

The inventors conducted a comprehensive study in order to develop a heat exchanger that is produced at a low cost and has a small size. The following has been found as a result of the study.

The inventors found that an increase in the heat exchange area over which the heat is exchanged between the electric power generating air and the combustion gas enables the heat exchanger to maintain required heat exchange performance and to have a small size at the same time. The inventors also found that the cost is reduced by simplifying the configurations of the electric power generating air channel and the combustion gas pipe, and as a result, developed the present disclosure. The disclosure includes aspects described below.

A heat exchanger according to a first aspect of the present disclosure includes a hollow housing including a first inlet member through which a first medium flows into the housing and a first outlet member through which the first medium flows out of the housing, an internal member disposed in the housing such that a space in the housing is divided into a first chamber and a second chamber, and a first external channel in the first chamber and a second external channel in the second chamber. The first external channel and the second external channel are in communication with the first inlet member and the first outlet member, respectively, such that the first medium flows through the first and second external channels. The internal member includes a diverging hole that divides the first medium flowing from the first inlet member into a flow flowing through the first external channel and a flow flowing through the second external channel, a converging hole that allows the divided first medium to converge, a second inlet member through which a second medium flows into the housing, a second outlet member through which the second medium flows out of the housing, and an internal channel that is in communication with the second inlet member and the second outlet member such that the second medium flows through the internal channel. The first external channel and the second external channel each include a first bent portion at which the first external channel and the second external channel are bent inwardly at a peripheral portion of each of the first chamber and the second chamber. The internal channel includes a second bent portion at which the internal channel is bent inwardly at a peripheral portion of the internal member. Heat is exchanged between the first medium, which flows through the first external channel and the second external channel, and the second medium, which flows through the internal channel.

In the above-described configuration, the heat exchanger according to the first aspect includes the diverging hole, enabling the first medium to be divided into a flow flowing along the internal channel on a side of the first chamber and a flow flowing along the internal channel on a side of the second chamber. In addition, the first external channel and the second external channel each include the first bent portion, and the internal channel includes the second bent portion. This configuration makes the channels longer than a channel extending linearly without including the bent portion.

The heat exchanger having the above-described configuration has a large heat exchange area over which heat is exchanged between the first medium, which flows through the first and second external channels, and the second medium, which flows through the internal channel, compared to a heat exchanger of the same size having linear channels, such as the heat exchanger described in Japanese Unexamined Patent Application Publication No. 2013-211202 or a double pipe heat exchanger. This enables the heat exchanger to maintain the required heat exchange performance and to have a small size.

Since the heat exchanger according to the first aspect has a simple configuration including the diverging hole, the converging hole, the first external channel, the second external channel, and the internal channel, the number of steps for producing the heat exchanger is small. This reduces the cost required for the production. In addition, the heat exchanger according to the first aspect maintains the required heat exchange performance due to the increased heat exchange area over which the heat is exchanged between the first medium and the second medium, not due to an increased flow rate of the first medium or the second medium. The heat exchanger according to the first aspect does not require an auxiliary machine for supplying the first medium or the second medium, or requires only a small and simple auxiliary machine.

The heat exchanger according to the first aspect has advantages of low cost and small size.

The heat exchanger according to a second aspect of the present disclosure, which is according to the first aspect, may further include a heat-transfer reduction portion disposed between a first half and a second half of each of the first external channel and the second external channel so as to reduce heat transfer between the first medium flowing through the first half and the first medium flowing through the second half. The first half extends from the first inlet member to the first bent portion. The second half extends from the first bent portion to the first outlet member.

In the above-described configuration, since each of the first and second external channels includes the heat-transfer reduction portion disposed between the first half and the second half, the heat exchange between the first medium, which flows through the first half, and the first medium, which flows through the second half, is reduced. This prevents the first medium in the first half, which has a temperature lower than the predetermined temperature, from cooling the first medium in the second half, which is heated to a predetermined temperature, for example.

In the heat exchanger according to a third aspect according to the first or second aspect, a wall defining the internal channel has a corrugated or wavy cross-sectional shape.

The above-described configuration increases a surface area of the wall defining the internal channel, and as a result, largely increases the area over which the heat is exchanged between the first medium and the second medium.

A method of producing a heat exchanger according to a fourth aspect of the present disclosure is a method of producing a heat exchanger in which heat is exchanged between a first medium and a second medium. The method includes stacking and connecting a first external member, a first internal member, a second internal member, and a second external member in this order. The connecting includes connecting the first external member and the first internal member to form a first chamber and a first external channel, through which the first medium flows, in the first chamber, connecting the first internal member and the second internal member to form an internal channel through which the second medium flows, and connecting the second internal member and the second external member to form a second chamber and a second external channel, through which the first medium flows, in the second chamber. The first chamber is a portion of a space defined between the first external member and the second external member. The second chamber is a portion of the space defined between the first external member and the second external member.

In the above-described method, the first and second external channels, through which the first medium flows, and the internal channel, through which the second medium flows, are formed by a simple production method including stacking and connecting the first external member, the first internal member, the second internal member, and the second external member in this order. This reduces the production cost of the heat exchanger.

The first medium flows through the first and second external channels, which are defined by the first and second internal members, in the first and second chambers. The second medium flows through the internal channel of the first and second internal members, which is positioned between the first and second external channels. This increases the heat exchange area over which the heat is exchanged between the first and second mediums, enabling the heat exchanger to maintain the required heat exchange performance and to have a small size.

The method of producing the heat exchanger according to the fourth aspect has the advantages of a low production cost and a reduction in the size of the heat exchanger.

In the method of producing the heat exchanger according to a fifth aspect, which is according to the fourth aspect, the first internal member, the second internal member, the first external member, and the second external member may be each formed of a drawn product or a cut product formed of at least one of an aluminum alloy, a magnesium alloy, a stainless steel, and a copper alloy. The connecting includes welding, brazing, or swaging each of the first internal member, the second internal member, the first external member, and the second external member.

In the method of producing the heat exchanger according to a sixth aspect, which is according to the fourth or fifth aspect, the first internal member and the second internal member may have an identical shape, and the first external member and the second external member may have an identical shape.

This configuration enables the first and second internal members to be formed of products having the identical shape or products formed by using dies having the identical shape, and this configuration enables the first and second external members to be formed of products having the identical shape or products formed by using dies having the identical shape. This largely reduces the number of processing steps, the number of steps for producing parts of the die, and the number of molding steps required for producing the heat exchanger. The number of steps for producing the heat exchanger is markedly reduced, leading to a reduction in production time and cost.

A fuel cell system according to a seventh aspect of the present disclosure includes a fuel cell that generates power through electrochemical reaction of a fuel gas and air, a combustion section that combusts an unused fuel gas that is not used in power generation in the fuel cell to produce an exhaust gas, and the heat exchanger according to any one of the first to third aspects in which heat is exchanged between the air as the first medium and the exhaust gas as the second medium.

In the above-described configuration, since the heat exchanger is reduced in terms of production cost and size, the production cost and the size of the fuel cell system on the whole is reduced.

The fuel cell system according to the seventh aspect has the advantages of a low cost and a small size.

Hereinafter, an embodiment of the present disclosure is described with reference to the drawings. The same reference numerals are assigned to the same or corresponding components in the drawings and detailed description thereof is omitted.

Embodiment

External Configuration of Heat Exchanger

Figure 3:
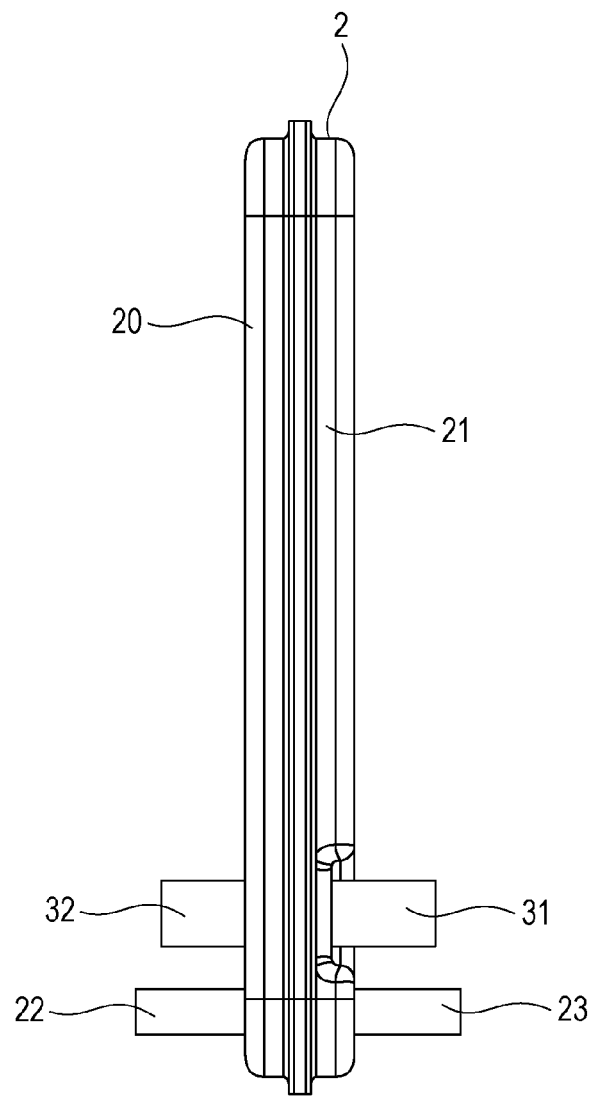
FIG. 3 is a right side view illustrating an example of the external configuration of the heat exchanger illustrated in FIG. 1A.
Figure 4:
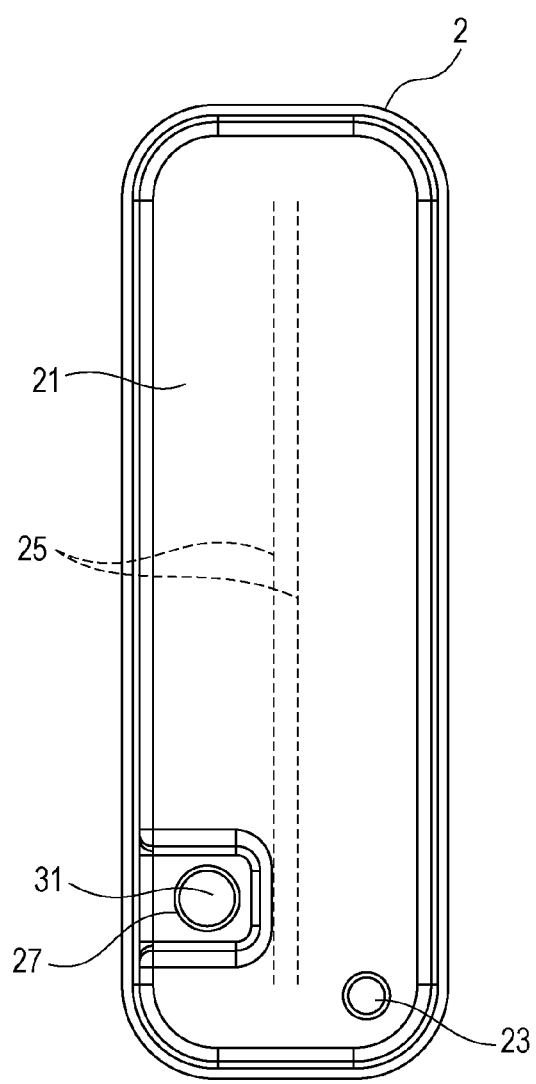
FIG. 4 is a rear view illustrating an example of the external configuration of the heat exchanger illustrated in FIG. 1A.

An external configuration of a heat exchanger 1 according to an embodiment is described with reference to FIG. 1A to FIG. 4. FIG. 1A is a perspective view illustrating an example of an external configuration of the heat exchanger 1 according to the embodiment. FIG. 1A illustrates the external configuration of the heat exchanger 1 viewed obliquely from the front. A side adjacent to a first external member 20 is defined as a front side and a side adjacent to a second external member 21 is defined as a rear side. A direction along the long sides of the first external member 20 and the second external member 21 is a vertical direction and a direction along the short sides thereof is a lateral direction. FIG. 2 is a front view illustrating an example of the external configuration of the heat exchanger 1 illustrated in FIG. 1A. In FIG. 2, the external configuration of the heat exchanger 1 is viewed from the front toward the rear. FIG. 3 is a right side view illustrating an example of the external configuration of the heat exchanger 1 illustrated in FIG. 1A. FIG. 4 is a rear view illustrating an example of the external configuration of the heat exchanger 1 illustrated in FIG. 1A. In FIG. 4, the external configuration of the heat exchanger 1 is viewed from the rear toward the front.

In the heat exchanger 1, thermal energy is transferred between a first medium and a second medium, which have different temperatures. Examples of the first medium and the second medium include a fluid such as water and air. As illustrated in FIG. 1A, the heat exchanger 1 includes a housing 2, a first inlet member 22, a first outlet member 23, a second inlet member 31, and a second outlet member 32. The heat exchanger 1 further includes an internal member 30 in the housing 2, although not illustrated in FIG. 1A.

The housing 2 is a hollow container having the first inlet member 22, which allows the first medium to flow into the housing 2, and the first outlet member 23, which allows the first medium to flow out of the housing 2. The housing 2 is a drawn product or a cut product formed of at least one of an aluminum alloy, a magnesium alloy, a stainless steel, and a copper alloy. The housing 2 may have any shape. The housing 2 illustrated in FIG. 1A has a planar cuboidal shape, for example. As illustrated in FIG. 3, the housing includes the first external member 20 positioned on the front side and the second external member 21 positioned on the rear side, which are connected to each other. The internal member 30, which is described later, is disposed inside the housing 2.

As illustrated in FIG. 2, the first external member 20 has a main surface having a substantially rectangular shape in which the long sides extend in the vertical direction. As illustrated in FIG. 1A and FIG. 3, the first external member 20 includes a wall protruding rearward and encompassing the main surface (peripheral portion). As illustrated in FIG. 4, the second external member 21 has a substantially rectangular shape, which is identical to the first external member 20. As illustrated in FIG. 1A and FIG. 3, the second external member 21 includes a wall protruding forward and encompassing the main surface (periphery). The walls of the first and second external members 20 and 21 form left, right, upper, and lower surfaces of the housing 2.

In FIG. 1A, the first medium and the second medium flow in parallel, but the second inlet member 31 and the second outlet member 32 may be disposed such that the first medium and the second medium flow in opposite directions as illustrated in FIG. 1B.

The first inlet member 22 is a tubular member through which the first medium outside the housing 2 flows into the housing 2. The first inlet member 22 extends substantially perpendicular to the main surface of the first external member 20 and protrudes toward the front side of the housing 2. The first outlet member 23 is a tubular member through which the first medium in the housing 2 flows out of the housing 2. The first outlet member 23 extends substantially perpendicular to the main surface of the second external member 21 and protrudes toward the rear side of the housing 2. The first inlet member 22 is connected to the first external member 20. The first outlet member 23 is connected to the second external member 21.

As illustrated in FIG. 2, when the housing 2 is viewed from the front, the first inlet member 22 is positioned around a lateral lower end of the housing 2 (around a right lower corner in FIG. 2). As illustrated in FIG. 4, when the housing 2 is viewed from the rear, the first outlet member 23 is positioned around the right lower corner as the first inlet member 22. Thus, when the housing 2 is viewed from the front, the first outlet member 23 is positioned at an inverted position of that in the housing 2 viewed from the rear (a left lower corner of the housing 2). The first inlet member 22 and the first outlet member 23 are drawn products or cut products formed of at least one of an aluminum alloy, a magnesium alloy, a stainless steel, and a copper alloy as the housing 2.

As illustrated in FIG. 2 and FIG. 4, the housing 2 includes a first through hole 26 that allows the second outlet member 32 to extend through the housing 2 and a second through hole 27 that allows the second inlet member 31 to extend through the housing 2. The second outlet member 32 and the second inlet member 31 of the internal member 30, which extend through the first and second through holes 26 and 27, protrude from the front and rear main surfaces of the housing 2, respectively.

As illustrated in FIG. 2 and FIG. 3, when the first inlet member 22, the first through hole 26, the first outlet member 23, and the second through hole 27 of the housing 2 are viewed from one side, the first outlet member 23 and the second through hole 27 are positioned at the inverted positions of the first inlet member 22 and the first through hole 26, respectively. Thus, as illustrated in FIG. 2 and FIG. 4, the first external member 20 and the second external member 21 may have an identical configuration.

Internal Configuration of Heat Exchanger

Figure 5:
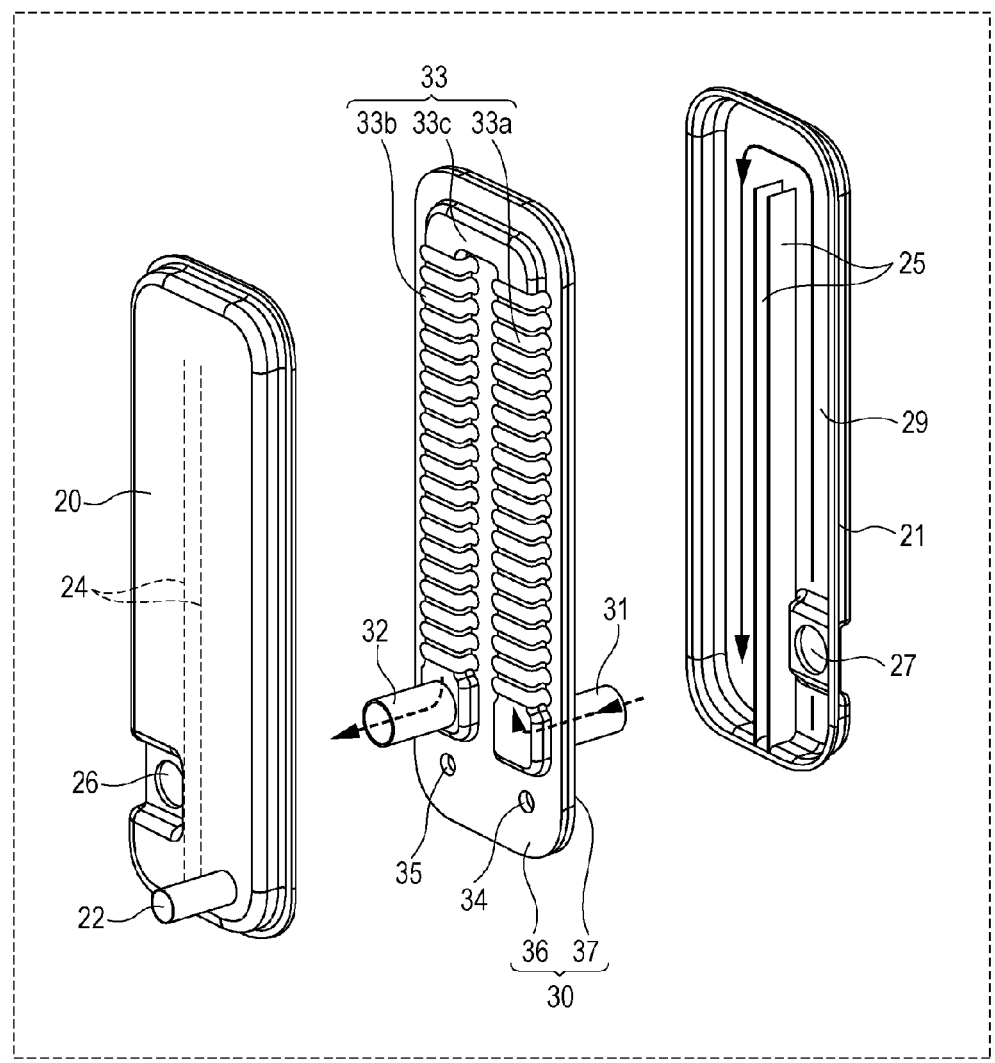
FIG. 5 is a perspective view illustrating an example of the heat exchanger illustrated in FIG. 1A in a disassembled state.
Figure 6:
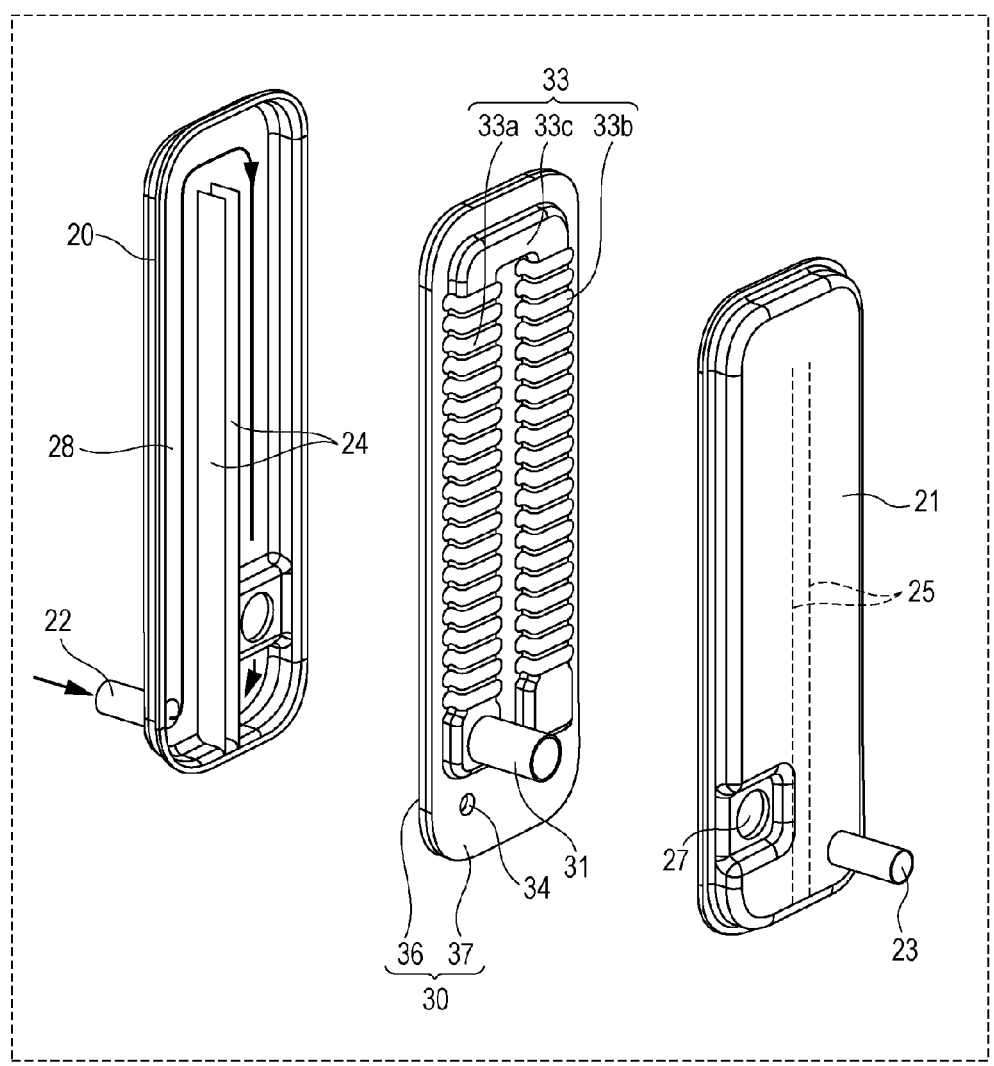
FIG. 6 is a perspective view illustrating an example of the heat exchanger illustrated in FIG. 1A in a disassembled state.
Figure 7:
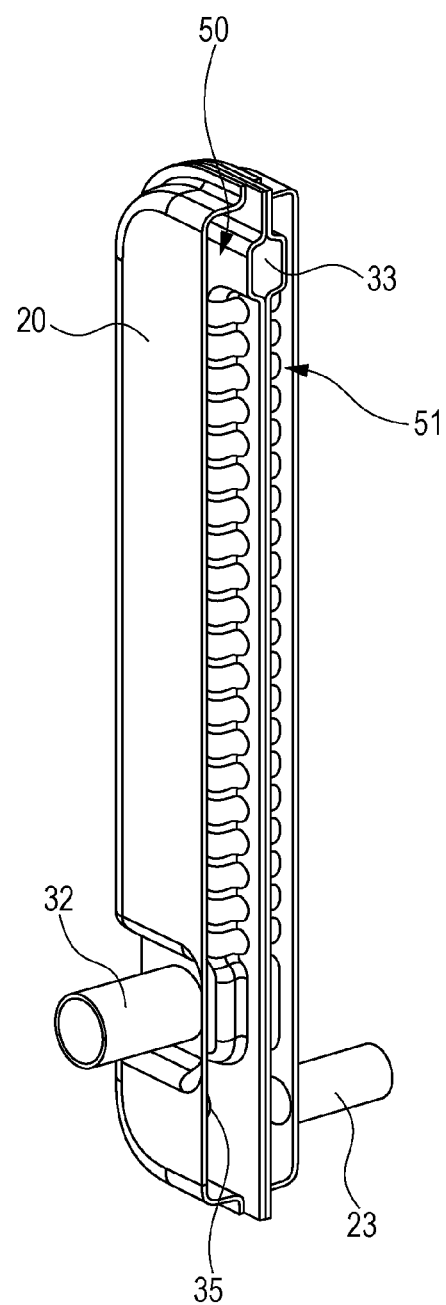
FIG. 7 is a cross-sectional view taken along a VII-VII line in FIG. 2.

An internal configuration of the heat exchanger 1 is described with reference to FIG. 5 to FIG. 7. FIG. 5 and FIG. 6 are perspective views illustrating an example of the heat exchanger 1 illustrated in FIG. 1A in a disassembled state. In FIG. 5, the disassembled state of the heat exchanger 1 is viewed obliquely from the front. In FIG. 6, the disassembled state of the heat exchanger 1 is viewed obliquely from the rear. FIG. 7 is a cross-sectional view illustrating the heat exchanger 1 taken along a line VII-VII in FIG. 2.

As illustrated in FIG. 5 and FIG. 6, the internal member 30 is disposed inside the housing 2. In FIG. 5 and FIG. 6, although the internal member 30 is illustrated as one component, the internal member 30 includes a first internal member 36, which includes the second outlet member 32, on the front side and a second internal member 37, which includes the second inlet member 31, on the rear side. The first and second internal members 36 and 37, which have an identical shape, are attached back to back. In the heat exchanger 1 of the embodiment, the internal member 30 may include two components as described above or may include a single component.

As illustrated in FIG. 7, the internal member 30 divides the space inside the housing 2 into a first chamber 50 and a second chamber 51. The first chamber 50 includes a first external channel 28 (FIG. 6) through which the first medium flowing from the first inlet member 22 flows. The second chamber 51 includes a second external channel 29 (FIG. 5) through which the first medium flowing from the first inlet member 22 flows. The first and second external channels 28 and 29 are in communication with the first inlet member 22 and the first outlet member 23, respectively. The first and second external channels 28 and 29 each have a bent portion (first bent portion), through which the first medium flows, at a midway portion thereof. Specifically, the first external channel 28 is substantially U shaped. The first external channel 28 extends vertically from the first inlet member 22 toward the upper side of the housing 2, and then turns at the first bent portion, which is positioned at the periphery (upper end) of the first chamber 50, so as to extend toward the lower side of the housing 2 to a converging hole 35. The second external channel 29 is substantially U shaped. The second external channel 29 extends vertically from a diverging hole 34 toward the upper side of the housing 2, and then turns at the first bent portion, which is positioned at the periphery (upper end) of the second chamber 51, so as to extend toward the lower side of the housing 2 to the first outlet member 23. Heat is exchanged between the first medium, which flows through the first and second external channels 28 and 29, and the second medium, which flows through the internal channel 33. The internal channel 33 is described later.

As illustrated in FIG. 5 and FIG. 6, a first heat-transfer reduction portion 24 is disposed on a rear surface (main surface on the rear side) of the first external member 20. The first heat-transfer reduction portion 24 reduces the heat transfer between the first medium flowing through a first half of the first external channel 28 (a portion from the first inlet member 22 to the first bent portion) and the first medium flowing through a second half (a portion from the first bent portion to the first outlet member 23). A second heat-transfer reduction portion 25 is disposed on a rear surface (main surface on the front side) of the second external member 21. The second heat-transfer reduction portion 25 reduces the heat transfer between the first medium flowing through the first half of the second external channel 29 and the first medium flowing through the second half of the second external channel 29.

The first and second heat-transfer reduction portions 24 and 25 each include two walls extending vertically in the middle of the housing 2 in the lateral direction. The walls are positioned between an upstream channel portion 33a and a downstream channel portion 33b, which are described later, of the internal channel 33 having the U shape, so as to extend along the upstream and downstream channel portions 33a and 33b. In the assembled housing 2, the first heat-transfer reduction portion 24 provides an air layer between the first half and the second half of the first external channel 28, and the second heat-transfer reduction portion 25 provides an air layer between the first half and the second half of the second external channel 29.

The two walls of the first heat-transfer reduction portion 24 provide the first external channel 28 in combination with the main surface of the first external member 20 and the wall extending along the periphery of the main surface. The two walls of the second heat-transfer reduction portion 25 provide the second external channel 29 in combination with the main surface of the second external member 21 and the wall extending along the periphery of the main surface.

As illustrated in FIG. 5 and FIG. 6, the internal member 30 includes the internal channel 33, the diverging hole 34, the converging hole 35, the second inlet member 31, and the second outlet member 32. As illustrated in FIG. 5 and FIG. 6, the shape of the main surface of the internal member 30 corresponds to the opening defined by the wall of the first external member 20 or the second external member 21. This enables the internal space of the housing 2 to be divided into the first chamber 50 and the second chamber 51 in a sealed state.

The diverging hole 34 is a through hole that divides the first medium flowing from the first inlet member 22 into a flow flowing through the first external channel 28 and a flow flowing through the second external channel 29. The flow rates of the flows of the first medium flowing through the first and second external channels 28 and 29 are adjusted by changing the opening area of the diverging hole 34. As illustrated in FIG. 5 and FIG. 6, the diverging hole 34, which is a through hole, is located in the internal member 30 at a position corresponding to the first inlet member 22 such that the first external channel 28 and the second external channel 29 are in communication. The position corresponding to the first inlet member 22 is a position facing the first inlet member 22 or a position near the position facing the first inlet member 22. The position corresponding to the first inlet member 22 in the internal member 30 does not include the internal channel 33. The opening area of the diverging hole 34 is set such that the first medium, which flows into the housing 2 through the first inlet member 22, flows through the first and second external channels 28 and 29 at the same flow rate. In other words, the first medium is halved by the diverging hole 34 into the flow flowing through the first external channel 28 and the flow flowing through the second external channel 29.

The converging hole 35 is a through hole that allows the first medium divided into the flows flowing through the first and second external channels 28 and 29 to converge, such that the converged first medium flows out of the housing 2 through the first outlet member 23. As illustrated in FIG. 5 and FIG. 6, the converging hole 35, which is a through hole, is positioned in the internal member 30 at a position corresponding to the first outlet member 23 such that the converging hole 35 allows the first external channel 28 and the second external channel 29 to be in communication. The position corresponding to the first outlet member 23 is a position facing the first outlet member 23 or a position near the position facing the first outlet member 23. The position corresponding to the first outlet member 23 in the internal member 30 does not include the internal channel 33.

The diverging hole 34 and the converging hole 35 are positioned bilaterally symmetrical with respect to the vertical center line of the internal member 30 when viewed from the front of the internal member 30, for example. The diverging hole 34 and the converging hole 35 have an identical opening size.

The second inlet member 31 is a tubular member through which the second medium outside the housing 2 flows into the housing 2. The second inlet member 31 extends substantially perpendicular to the rear main surface of the internal member 30. The second inlet member 31 extends through the second through hole 27 of the second external member 21 and protrudes toward the rear side of the housing 2.

The second outlet member 32 is a tubular member through which the second medium in the housing 2 flows out of the housing 2. The second outlet member 32 extends substantially perpendicular to the front main surface of the internal member 30. The second outlet member 32 extends through the first through hole 26 of the first external member 20 and protrudes toward the front side of the housing 2.

When the housing 2 is viewed from the rear, the second inlet member 31, which is located at the lower side of the housing 2, is positioned at the lateral end opposite the end where the first outlet member 23 is positioned. When the housing 2 is viewed from the front, the second outlet member 32, which is located at the lower side of the housing 2, is positioned at the lateral end opposite the end where the first inlet member 22 is positioned.

As illustrated in FIG. 5 and FIG. 6, the first and second internal members 36 and 37 may be formed of components having an identical shape. The first and second internal members 36 and 37 are connected back to back to constitute the internal member 30.

The internal channel 33, which is a channel through which the second medium flows, extends along the first and second external channels 28 and 29, and turns at the periphery (upper end) of the internal member 30. The internal channel 33 is in communication with the second inlet member 31 on the rear side of the internal member 30 and the second outlet member 32 on the front side. As illustrated in FIG. 5 and FIG. 6, the internal channel 33 includes the upstream channel portion 33a, the downstream channel portion 33b, and the bent portion (second bent portion) 33c. The upstream channel portion 33a, which is in communication with the second inlet member 31, extends from the second inlet member 31 linearly upward in the vertical direction of the internal member 30. The downstream channel portion 33b, which is in communication with the second outlet member 32, extends from the bent portion 33c linearly downward in the vertical direction of the internal member 30. The bent portion 33c connects the upstream channel portion 33a and the downstream channel portion 33b to each other and allows the second medium flowing from the upstream channel portion 33a to turn to the downstream channel portion 33b. The internal channel 33 has a U shape.

The walls defining the upstream and downstream channel portions 33a and 33b of the internal channel 33 each have a corrugated cross-sectional shape, for example. The cross-sectional shape of the wall is not limited to the corrugated cross-sectional shape. The wall may have a wavy cross-sectional shape. Alternatively, a plurality of fins may be disposed on the outer surface of the wall.

The internal member 30, the internal channel 33, the second inlet member 31, and the second outlet member 32 are drawn products or cut products formed of at least one of an aluminum alloy, a magnesium alloy, a stainless steel, and a copper alloy.

The heat exchanger 1 having the above-described configuration allows the heat exchange between the first medium, which flows through the first and second external channels 28 and 29, and the second medium, which flows through the internal channel 33. Hereinafter, the flow of each of the first medium and the second medium in the heat exchanger 1 is described.

Flows of First and Second Mediums

The first medium flows into the housing 2 through a first medium intake pipe (not illustrated), which is an external component connected to the first inlet member 22. Then, a portion of the first medium passes through the diverging hole 34 and becomes a flow flowing through the second external channel 29. The remaining portion of the first medium becomes a flow flowing through the first external channel 28. The flow rate of each of the portions of the first medium flowing through the first and second external channels 28 and 29, which are divided by the diverging hole 34, is substantially half of the flow rate of the first medium flowing into the housing 2.

The first medium in the first external channel 28 and the second external channel 29 flows upward from the lower section of the housing 2 and turns at the periphery (upper end) of the housing 2 to flow to the converging hole 35 of the internal member 30. Then, the first medium flowing through the first external channel 28 joins the first medium flowing through the second external channel 29 through the converging hole 35. The converged first medium is introduced to a first medium outlet pipe (not illustrated) connected to the first outlet member 23. The flow velocity and pressure loss of the first medium flowing through the first and second external channels 28 and 29 are adjusted by changing the opening area of each of the diverging hole 34 and the converging hole 35.

The second inlet member 31 is disposed on the side of the housing 2 opposite from the first inlet member 22. The second inlet member 31 is connected to a second medium intake pipe (not illustrated), which is an external component for supplying the second medium into the housing 2. The second medium that entered the internal channel 33 through the second inlet member 31 flows through the upstream channel portion 33a of the internal channel 33. The second medium that passed through the upstream channel portion 33a turns at the bent portion 33c to the downstream channel portion 33b. Then, the second medium is introduced to a second medium outlet pipe (not illustrated), which is an external component connected to the second outlet member 32.

As described above, the first medium flows into the housing 2 from the front side of the housing 2 and flows out of the housing 2 from the rear side of the housing 2. The second medium flows into the housing 2 from the rear side of the housing 2 and flows out of the housing 2 from the front side. Heat is exchanged between the first medium, which flows through the first and second external channels 28 and 29, and the second medium, which flows through the internal channel 33, through the wall defining the internal channel 33. Heat is transferred from the medium having a higher thermal energy to the medium having a lower thermal energy. The wall defining the internal channel 33 provides a boundary surface between the first medium and the second medium. The heat is exchanged between the first medium and the second medium through the boundary surface. The heat exchange performance in the heat exchanger 1 is determined by the flow rate and the temperature of the first medium flowing through the first and second external channels 28 and 29, the flow rate and the temperature of the second medium flowing through the internal channel 33, the thermal conductivity at the boundary surface, which depends on the material of the wall, the area of the boundary surface, and the amount of heat dissipated from the first and second external channels 28 and 29 to the outside of the heat exchanger 1.

The heat is exchanged between the first medium and the second medium over the wall (boundary surface) defining the internal channel 33. The cross-sectional shape of the wall of the internal channel 33 is the corrugated cross-sectional shape as described above. Thus, the surface area over which the heat is exchanged between the first medium and the second medium is large.

Method of Assembling

A method of assembling the heat exchanger 1 having the above-described configuration is described. The components of the heat exchanger 1 are described. As described above, the heat exchanger 1 includes the first external member 20, the second external member 21, and the internal member 30.

As illustrated in FIG. 2 and FIG. 4, the first and second external members 20 and 21 have an identical shape. The internal member 30 includes the first internal member 36 and the second internal member 37, which are stacked on each other as described above. Thus, in the assembling of the heat exchanger 1, only two kinds of components need to be prepared, i.e., components serving as the first and second external members 20 and 21 and components serving as the first and second internal members 36 and 37. This reduces the production cost of the heat exchanger 1.

Figure 8:
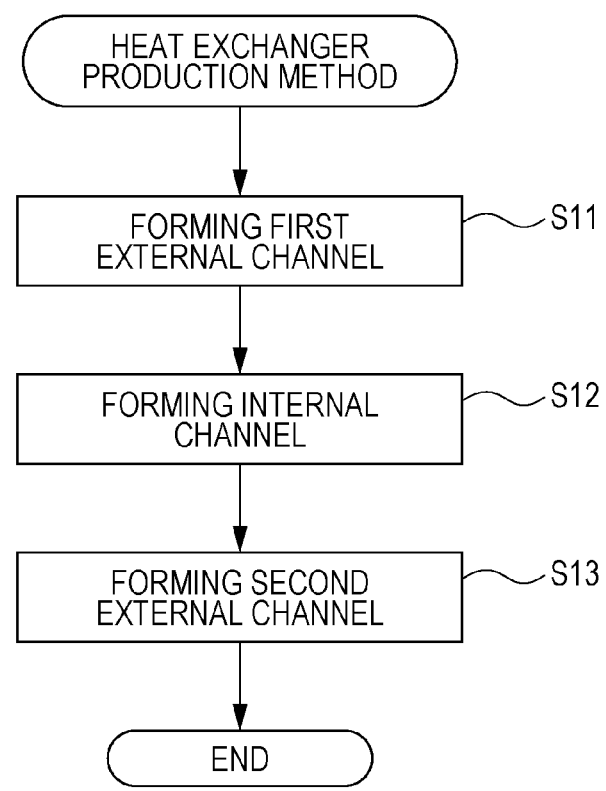
FIG. 8 is a flow chart indicating an example of a method of producing the heat exchanger according to the embodiment of the present disclosure.

After the preparation of the components having the above-described shape, the first external member 20, the first internal member 36, the second internal member 37, and the second external member 21 are stacked and connected in this order from the front side of the heat exchanger 1. Hereinafter, a method of producing the heat exchanger 1 is described in detail with reference to FIG. 8. FIG. 8 is a flow chart indicating an example of the method of producing the heat exchanger 1 according to the embodiment of the present disclosure.

The first external member 20 and the first internal member 36 are connected at first. This forms the first chamber 50 including the first external channel 28 through which the first medium flows (step S11). The first inlet member 22 is attached in this step S11.

Then, the first internal member 36 and the second internal member 37 are connected. This forms the internal channel 33 through which the second medium flows (step S12). When the first and second internal members 36 and 37 are connected, the second inlet member 31 and the second outlet member 32, which are in communication with the internal channel 33, form the flow route of the second medium in combination with the internal channel 33. In the step S12, the diverging hole 34 and the converging hole 35 are also provided.

Then, the second internal member 37 and the second external member 21 are connected. This forms the second chamber 51 including the second external channel 29 through which the first medium flows (step S13). In the step S13, the first outlet member 23 is attached, and thus the flow route of the first medium is provided.

As described above, the heat exchanger 1 is assembled by stacking and connecting the first external member 20, the first internal member 36, the second internal member 37, and the second external member 21 in this order. The heat exchanger 1 having the channels for the first medium and the second medium is readily produced. The first external member 20, the first internal member 36, the second internal member 37, and the second external member 21 may be connected at the peripheral portions thereof by welding, brazing, swaging or fixing with fixtures.

A welding process or a fastening process with screws may be performed intermittently along the vertical center line of the first and second internal members 36 and 37 to connect the first and second members 36 and 37. This configuration prevents the second medium from leaking at a midway position of the upstream channel portion 33a into a midway position of the downstream channel portion 33b, i.e., prevents the second medium from taking a shortcut. Since this configuration prevents the second medium from taking a shortcut in the internal channel 33, the heat exchange performance of the heat exchanger 1 is improved.

In the heat exchanger 1, the heat is exchanged between the first and second mediums over a contact area between each of the first and second external channels 28 and 29, through which the first medium flows, and the internal channel 33, through which the second medium flows. The contact area is equal to the surface area of the wall defining the internal channel 33. Thus, the heat exchange rate between the first and second mediums is determined by the surface area of the wall defining the internal channel 33 and the thermal conductivity of the material constituting the wall. Thus, the heat exchange rate is adjusted by changing the length of the internal channel 33 and the corrugated shape of the wall defining the internal channel 33 as needed.

In the heat exchanger 1, the internal channel 33, the first external channel 28, and the second external channel 29 each have a U shape having a bent portion. Thus, the channels 33, 28, and 29 is made long compared to those extending linearly. In addition, the first medium is divided by the diverging hole 34 into the flow flowing on the front side of the internal channel 33 and the flow flowing on the rear side of the internal channel 33, and the internal channel 33 has the corrugated wall. This increases the heat exchange area over which the heat is exchanged between the first and second mediums. As described above, the heat exchanger 1 has a larger heat exchange area over which the heat is exchanged than conventional double pipe heat exchangers, for example. The channels of the heat exchanger 1 do not need to be elongated in one direction. This configuration enables the heat exchanger 1 according to the embodiment of the present disclosure to have a largely reduced size.

Advantages of Heat Exchanger

As described above, the heat exchanger 1, which has the large heat exchange area over which the heat is exchanged between the electric power generating air and the combustion gas, maintains the required heat exchange performance and has a small size. The heat exchange performance is not improved by reducing the cross-sectional area of one of the internal channel 33 and the first and second external channels 28 and 29 and increasing the pressure loss. Thus, compared to conventional double pipe heat exchangers or plate heat exchangers, the pressure loss of the first or second medium is reduced markedly in the heat exchanger 1. This configuration does not require an auxiliary machine that supplies the first or second medium having an increased pressure to the heat exchanger 1, or requires only a small machine.

In the heat exchanger 1, the internal member 30 includes the diverging hole 34. This configuration enables the adjustment of the flow rate of the first medium flowing through each of the first and second external channels 28 and 29 by changing the opening area of the diverging hole 34, and as a result, enables the adjustment of the heat exchange rate between the first and second mediums. The diverging hole 34 having a simple configuration, which is formed by a small number of steps enables the adjustment of the heat exchange rate. In the above-described configuration, the first medium flowing from the first inlet member 22 is halved by the diverging hole 34, but the diverging ratio is not limited to the half. The opening area of the diverging hole 34 may be adjusted according to the required heat exchange rate between the first and second mediums.

As described above, the heat exchanger 1 includes the first and second heat-transfer reduction portions 24 and 25 between the first half and the second half of each of the U-shaped first and second external channels 28 and 29. This largely reduces the heat transfer between the first medium flowing through the first half and the first medium flowing through the second half in each of the first and second external channels 28 and 29. This prevents the first medium in the first half, which has a temperature lower than a predetermined temperature, from cooling the first medium in the second half, which is heated to a predetermined temperature.

In the heat exchanger 1, each of the internal channel 33 and the first and second external channels 28 and 29 has the U shape as described above. This configuration enables the heat exchanger 1 to have the required heat exchange performance without having a shape elongated in one direction as double pipe heat exchangers, for example. The aspect ratio of the heat exchanger 1 is readily adjusted. This enables the heat exchanger 1 to have any dimension and shape.

As described above, the first and second internal members 36 and 37 and the first and second external members 20 and 21 are drawn products or cut products formed of at least one of an aluminum alloy, a magnesium alloy, a stainless steel, and a copper alloy. Since such metals increase the thermal conductivity, the heat exchange performance between the first and second mediums is improved.

In the heat exchanger 1, the cross-sectional shape of the wall defining the internal channel 33 of the internal member 30 is the corrugated cross-sectional shape. This increases the surface area of the wall defining the internal channel 33, and as a result, largely increases the heat exchange area over which the heat is exchanged between the first and second mediums. This enables the heat exchanger 1 to have a smaller size and have improved efficiency. In addition, since the wall defining the internal channel 33 provides the boundary between the first and second mediums, the corrugated cross-sectional shape of the wall defining the internal channel 33 encourages the first medium and the second medium to become turbulent flows. This increases the coefficient of the heat transfer between the first medium and the second medium, and as a result, largely increases the heat exchange performance. Although the cross-sectional shape of the wall defining the internal channel 33 is the corrugated cross-sectional shape in this embodiment, the cross-sectional shape is not limited, and may be a wavy cross-sectional shape. However, the corrugated or wavy cross-sectional shape is optional, and a plurality of fins may be disposed on the outer surface of the wall defining the internal channel 33 at predetermined intervals.

In addition, in the heat exchanger 1, the above-described configuration enables the first and second internal members 36 and 37 to have an identical shape. In addition, the above-described configuration enables the first and second external members 20 and 21 to have an identical shape. Thus, the first and second internal members 36 and 37 may be formed of the same products or products formed by using the same die, and the first and second external members 20 and 21 may be formed of products having the identical shape or products formed by dies having the identical shape. This largely reduces the number of processing steps, the number of steps for producing the die, and the number of molding steps required for producing the heat exchanger 1. This reduces the cost of the heat exchanger 1, since the heat exchanger 1 is produced through the largely reduced production step and with the reduced production time.

Modifications

The internal channel 33 in the internal member 30 of the heat exchanger 1 has the substantially U shape including the upstream channel portion 33a, the downstream channel portion 33b, and the bent portion 33c. However, the shape of the internal channel 33 is not limited to the substantially U shape, and may be a serpentine shape including a plurality of bent portions 33c and linear portions connecting the bent portions 33c to each other.

The internal channel 33 having the serpentine shape enables the internal channel 33 to have a substantially square shape in front view. This configuration allows the aspect ratio of the heat exchanger 1 to be readily adjusted, and thus the size of the heat exchanger 1 is made small compared to that of the double pipe heat exchanger extending in one direction.

The first inlet member 22 through which the first medium flows into the housing 2 and the second inlet member 31 through which the second medium flows into the housing 2 are disposed on the opposite sides of the heat exchanger 1. The first outlet member 23 through which the first medium flows out of the housing 2 and the second outlet member 32 through which the second medium flows out of the housing 2 are disposed on the opposite sides of the heat exchanger 1. However, the first and second inlet members 22 and 31 may be disposed on the same side of the heat exchanger 1 (front side, for example), and the first and second outlet members 23 and 32 may be disposed on the same side of the heat exchanger 1 (rear side, for example).

In the heat exchanger 1 illustrated in FIG. 1A, the first inlet member 22 is disposed on the front side and the first outlet member 23 is disposed on the rear side, but the positions may be switched. In addition, in the heat exchanger 1, the second inlet member 31 is disposed on the rear side and the second outlet member 32 is disposed on the front side, but the positions may be switched.

The first and second heat-transfer reduction portions 24 and 25 each include the two walls, but the configuration thereof is not limited to this. The first and second heat-transfer reduction portions 24 and 25 may include one wall formed of a material having low thermal conductivity.

EXAMPLE

Figure 9:
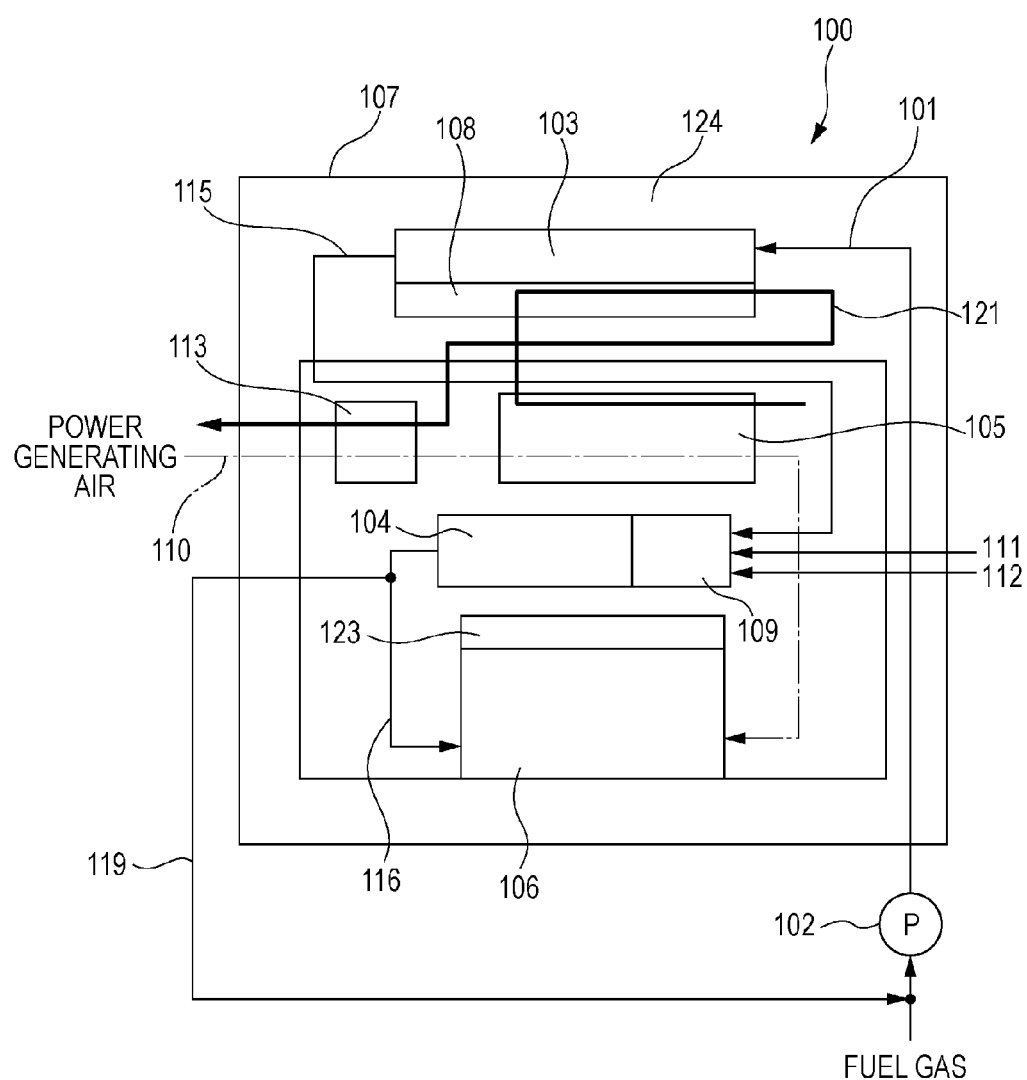
FIG. 9 is a schematic view illustrating main components of a fuel cell system, for example, including the heat exchanger in an example of the embodiment of the present disclosure.

An example of the heat exchanger 1 according to the embodiment of the present disclosure is described with reference to FIG. 9. FIG. 9 is a view schematically illustrating main components of a fuel cell system 100 including the heat exchanger 1 of the example according to the embodiment of the present disclosure, for example. In this example, the heat exchanger 1 is disposed in the fuel cell system 100. A fuel cell 106 in the fuel cell system 100 is a solid oxide fuel cell, for example.

Configuration of Fuel Cell System

The fuel cell system 100 is described at first. The fuel cell system 100 includes a fuel gas supply pump 102, a hydrodesulfurizer 103, a reformer 104, an air heat exchanger 105, the fuel cell 106, a hydrodesulfurizer heater 108, an evaporator 109, an auxiliary heat exchanger 113, an exhaust gas inlet 120, a combustion section 123, a heat insulating section 124, and a housing 107. Various passages through which the fluid flows are disposed so as to connect the components.

The passages include a fuel gas passage 101 through which a fuel gas used for power generation in the fuel cell 106 flows and an electric power generating air passage 110 through which the electric power generating air flows. The passages further include a reforming water passage 111 and a reforming air passage 112 through which a reforming water and the air, respectively, flow to the reformer 104. The passages further include a desulfurized fuel gas passage 115 through which the fuel gas desulfurized by the hydrodesulfurizer 103 flows, a reformed gas passage 116 through which the reformed fuel gas (reformed gas) reformed by the reformer 104 flows, and a recycle passage 119 through which a portion of the reformed gas, which is to be supplied to the hydrodesulfurizer 103, flows. The passages further include an exhaust gas passage 121 through which the exhaust gas generated due to the combustion at the combustion section 123 flows.

In the fuel cell system 100, the reformer 104 reforms the fuel gas supplied from outside the housing 107, and the fuel cell 106 generates power through the power generation reaction of the reformed gas and the electric power generating air supplied from outside. The reforming reaction at the reformer 104 is described in detail later. In the operation (power generating operation) of the fuel cell 106, unused reformed gas, which is not used in the power generation reaction, and the electric power generating air are combusted together at the combustion section 123 to produce the exhaust gas having a high temperature. The thermal energy is efficiently used to perform a high-efficiency power generating operation.

In the fuel cell system 100, the insulating section 124 formed of an insulating material is disposed on the inner side (inner surface) of the housing 107 such that the amount of heat released from the housing 107 to the outside is reduced as much as possible. The fuel gas supply pump 102 is disposed outside the housing 107. The fuel gas supply pump 102 increases the pressure of the supplied fuel gas and sends the gas to the hydrodesulfurizer 103, which is disposed in the housing 107, through the fuel gas passage 101. Examples of the fuel gas include liquefied natural gas and liquefied petroleum gas, which include hydrocarbon as a main component.

The fuel cell 106 is a solid oxide fuel cell that generates power through the power generation reaction caused by using the reformed gas, which is generated through the reformation of the supplied fuel gas, and the electric power generating air. The fuel cell 106 has an anode, to which the reformed gas is supplied, and a cathode, to which the electric power generating air is supplied. The fuel cell 106 includes a plurality of cells that generate power through the power generation reaction caused between the anode and the cathode. The cells are connected in series to constitute a cell stack. In the fuel cell 106, another cell stack, which includes cells connected in series, may be connected in parallel to the cell stack.

The cells of the fuel cell 106 may be formed of yttria-stabilized zirconia (YSZ), ytterbium or scandium stabilized zirconia, or lanthanum gallate based solid electrolyte.

The hydrodesulfurizer 103 removes a sulfur component in the fuel gas through hydrodesulfurization. The hydrodesulfurizer heater 108, which is positioned below the hydrodesulfurizer 103, is disposed midway of the exhaust gas passage 121 so as to heat the hydrodesulfurizer 103 to a predetermined temperature with heat of the exhaust gas. The hydrodesulfurizer 103 is disposed in the heat insulating section 124 at a position above the combustion section 123 so as to face the combustion section 123 (i.e., upper section of the housing 107).

The fuel cell system 100 includes the recycle passage 119 branched from the reformed gas passage 116, which extends to the fuel cell 106 as described above. A portion of the reformed gas generated by the reformer 104 flows through the recycle passage 119 to the fuel gas passage 101, and then the portion flows to the hydrodesulfurizer 103 together with the fuel gas. The hydrogenated fuel gas is supplied to the hydrodesulfurizer 103, and thus the hydrodesulfurizer 103 uses the hydrogen for hydrodesulfurization reaction.

Examples of a desulfurizing agent filled in the hydrodesulfurizer 103 include a desulfurizing agent including copper or zinc. However, the desulfurizing agent may be any desulfurizing agent, and may be a combination of a Ni—Mo or Co—Mo catalyst and zinc oxide. When the desulfurizing agent including the combination of the Ni—Mo or Co—Mo catalyst and zinc oxide is used, the hydrodesulfurizer 103 decomposes the sulfur component in the fuel gas at a temperature in a range of 350 to 400° C. Then, the hydrodesulfurizer 103 allows the zinc oxide (ZnO) to adsorb the resulting hydrogen sulfide ($H_2S$) at a temperature in a range of 350 to 400° C. and removes it.

The liquefied natural gas used as the fuel gas includes dimethyl sulfide ($C_2H_6S$, DMS), which is a sulfur compound, as an odorant. The hydrodesulfurizer 103 removes DMS in the form of zinc sulfide (ZnS) through reaction indicated by the following reaction formulas (1) and (2) or removes DMS through physically adsorption by using the desulfurizing agent.

$$C_2H_6S+2H_2 \rightarrow 2CH_4+H_2S \quad (1)$$

$$H_2S+ZnO \rightarrow H_2O+ZnS \quad (2)$$

The odorant is not limited to the dimethyl sulfide (DMS), and may be another sulfur component such as tert-butyl mercaptan (TBM, $C_4H_{10}S$) or tetrahydrothiophene (THT, $C_4H_8S$).

When the desulfurizing agent filled in the hydrodesulfurizer 103 includes copper and zinc, the hydrodesulfurizer 103 removes sulfur at a temperature of about 10 to about 400° C., preferably at a temperature of about 150 to about 300° C. The copper-zinc desulfurizing agent, which has physical adsorption ability in addition to the desulfurization ability, typically causes physical adsorption at a low temperature and chemical adsorption at a high temperature. In this case, the content of sulfur in the desulfurized fuel gas is 1 vol ppb (parts per billion) or less, generally 0.1 vol ppb or less. The fuel gas desulfurized by the hydrodesulfurizer 103 as described above is supplied to the reformer 104.

The reformer 104 is described in detail. The reformer 104 may be used for partial oxidation reforming. However, the reformer 104 is advantageously configured to perform steam reforming reaction as well as the partial oxidation reforming reaction so as to have high-efficiency performance. As illustrated in FIG. 9, the evaporator 109 is disposed upstream of the reformer 104. The water (reforming water) supplied through the reforming water passage 111 is mixed into the desulfurized fuel gas, and the mixture is supplied to the reformer 104 through the evaporator 109.

Examples of a reforming catalyst filled in the reformer 104 include a nickel (Ni) impregnated and supported alumina ($Al_2O_3$) catalyst and a ruthenium-on-alumina catalyst.

In the fuel cell system 100 shortly after the activation, the temperature in the housing 107 is not sufficiently raised. In such a case, the reformer 104 may have a shortage of the thermal energy for the steam reforming reaction, which is an endothermic reaction. Thus, in the fuel cell system 100 shortly after the activation, the water is not supplied to the evaporator 109 through the reforming water passage 111. The reformer 104 causes the partial oxidation reforming reaction indicated by the following formula (3) by using air introduced through the reforming air passage 112 to generate the reformed gas including a hydrogen gas and carbon monoxide.

$$C_nH_m+(n/2)O_2 \rightarrow n.CO+(m/2)H_2, \text{ where } n \text{ and } m \text{ are natural numbers.} \quad (3)$$

The reformed gas is supplied to the fuel cell 106 through the reformed gas passage 116. In the fuel cell 106, power generation reaction is caused by using the reformed gas supplied through the reformed gas passage 116 and the electric power generating air supplied through the electric power generating air passage 110.

As the power generation in the fuel cell 106 continues, the temperature of the reformer 104 increases. The partial oxidation reforming reaction indicated by the formula (3) is an exothermic reaction. In addition, radiant heat from the combustion section 123 and heat of the exhaust gas generated at the combustion section 123 increase the temperature of the reformer 104. When the temperature of the reformer 104 reaches 400° C. or more, for example, the reformer 104 may perform the steam reforming reaction indicated by the following formula (4) concurrently with the partial oxidation reforming reaction.

$$C_nH_m+n.H_2O \rightarrow n.CO+(m/2+n)H_2, \text{ where } n \text{ and } m \text{ are natural numbers.} \quad (4)$$

The steam reforming reaction indicated by the formula (4) produces more hydrogen than the partial oxidation reforming reaction indicated by the formula (3) from hydrocarbon ($C_nH_m$) of the same amount. Thus, the flow rate of the reformed gas, which is used in the power generation reaction at the fuel cell 106, increases. In addition, since the steam reforming reaction indicated by the formula (4) is the endothermic reaction, the reformer 104 proceeds with the steam reforming reaction by using the heat generated by the partial oxidation reforming reaction indicated by the formula (3), the heat of the exhaust gas from the combustion section 123, and the radiant heat from the combustion section 123. When the temperature of the reformer 104 reaches 600° C. or more, for example, the reformer 104 may perform only the steam reforming reaction.

The evaporator 109 is disposed for the steam reforming reaction in the reformer 104. The evaporator 109 evaporates the water supplied through the reforming water passage 111 by using the heat of the exhaust gas from the combustion section 123 and the radiant heat from the combustion section 123 such that the evaporated water is mixed with the desulfurized fuel gas supplied from the hydrodesulfurizer 103. The evaporator 109 supplies the gas mixture to the reformer 104.

The air heat exchanger 105 is configured to heat the electric power generating air, which is used for the power generation reaction at the fuel cell 106, and is positioned so as to face the combustion section 123. The electric power generating air is supplied from outside the fuel cell system 100 to the air heat exchanger 105 through the electric power generating air passage 110. In addition, the exhaust gas generated by the combustion at the combustion section 123 is supplied to the air heat exchanger 105. The heat is exchanged between the electric power generating air and the exhaust gas, and thus the electric power generating air is heated. The air passed through the air heat exchanger 105 is heated to about 400 to 800° C. The heated electric power generating air is supplied to the fuel cell 106.

The air heat exchanger 105 alone does not heat the electric power generating air to a predetermined temperature in some cases. To solve the problem, an auxiliary heat exchanger 113 is provided for reliably heating the electric power generating air to the predetermined temperature and for cooling the exhaust gas, which is to be expelled from the system, such that the energy expelled from the system is reduced. The auxiliary heat exchanger 113 is disposed upstream of the air heat exchanger 105 in the electric power generating air passage 110 and downstream of the air heat exchanger 105 in the exhaust gas passage 121 such that the heat is exchanged between the electric power generating air and the exhaust gas.

In the fuel cell system 100, the exhaust gas flows through the exhaust gas passage 121 so as to pass through the air heat exchanger 105, the hydrodesulfurizer heater 108, and the auxiliary heat exchanger 113 in this order and flows out to the outside. The configuration of the fuel cell system 100 is simplified by reducing the number of pipes of the electric power generating air passage 110 through which the electric power generating air flows as well as the number of pipes of the exhaust gas passage 121 through which the exhaust gas flows. This reduces the size of the fuel cell system. The fuel cell system 100 may be reduced in the size by reducing the size of the air heat exchanger 105, the hydrodesulfurizer heater 108, and the auxiliary heat exchanger 113.

In this example, the heat exchanger 1 according to the embodiment is used as the auxiliary heat exchanger 113. The electric power generating air as the first medium and the exhaust gas as the second medium each flow into the heat exchanger 1. When the heat exchanger 1 is used as the auxiliary heat exchanger 113, the heat exchanger 1 is designed in view of the heat exchange performance required as the auxiliary heat exchanger 113, the flow rate of the air and the flow rate of the exhaust gas required for the required heat exchange performance, the desired size, and the number of production steps (production cost).

In this example, since the heat exchanger 1 according to the embodiment is used as the auxiliary heat exchanger 113, the auxiliary heat exchanger 113 has a small size compared to a conventional double pipe heat exchanger, for example. This enables the auxiliary heat exchanger 113 to be positioned close to the air heat exchanger 105. This reduces the number of pipes of the exhaust gas passage 121 and the electric power generating air passage 110, leading to a reduction in heat dissipation from the pipes. The heat dissipation from the auxiliary heat exchanger 113 is also reduced largely. In addition, this configuration enables the housing 107 to have a small size, and thus the area from which the heat inside the housing 107 is dissipated to the outside is reduced. Thus, the power generation efficiency of the fuel cell system 100 is improved. In addition, compared to the conventional double pipe heat exchanger, for example, the auxiliary heat exchanger 113 has a large heat exchange area over which the heat is exchanged between the exhaust gas and the air. This reduces the pressure loss of the fluid flowing through the housing 107. This does not require the auxiliary machine such as a compressor or requires only a small auxiliary machine.

In the above-described configuration, the heat exchanger 1 according to the embodiment of the present disclosure is used as the auxiliary heat exchanger 113. However, the heat exchanger 1 may be used as the air heat exchanger 105.

In the above-described fuel cell system 100, the electric power generating air and the exhaust gas are used as the first medium and the second medium, respectively, which flow through the heat exchanger 1. Specifically, the air having a low temperature is used as the first medium, which flows through the first and second external channels 28 and 29, and the exhaust gas having a high temperature is used as the second medium, which flows through the internal channel 33. This largely reduces the heat dissipation from the heat exchanger 1.

A person skilled in the art readily achieves modifications and other embodiments of the present disclosure from the above description. The above description should be understood as one of examples. The above description is given as teaching of aspects of the present disclosure for those skilled in the art. Various modifications may be applied to the structure and/or the details of functions without departing from the gist of the present disclosure.

The heat exchanger of the present disclosure is applicable to a fuel cell system in which the heat exchanger is required in order to improve power generation efficiency, for example.

What is claimed is:
1. A heat exchanger comprising:
   a hollow housing including a first inlet member through which a first medium flows into the housing and a first outlet member through which the first medium flows out of the housing;
   an internal member disposed in the housing such that a space in the housing is divided into a first chamber and a second chamber; and
   a first external channel in the first chamber and a second external channel in the second chamber, the first external channel and the second external channel being in communication with the first inlet member and the first outlet member, respectively, such that the first medium flows through the first external channel and the second external channel,
   the internal member including:
      a diverging hole that divides the first medium flowing from the first inlet member into a flow flowing through the first external channel and a flow flowing through the second external channel;
a converging hole that allows the divided first medium to converge;
a second inlet member through which a second medium flows into the housing;
a second outlet member through which the second medium flows out of the housing; and
an internal channel that is in communication with the second inlet member and the second outlet member such that the second medium flows through the internal channel, wherein
the first external channel and the second external channel each include a first bent portion at which the first external channel and the second external channel are bent inwardly at a peripheral portion of each of the first chamber and the second chamber, and the internal channel includes a second bent portion at which the internal channel is bent inwardly at a peripheral portion of the internal member, and
heat is exchanged between the first medium, which flows through the first external channel and the second external channel, and the second medium, which flows through the internal channel.

2. The heat exchanger according to claim 1, further comprising a heat-transfer reduction portion disposed between a first half and a second half of each of the first external channel and the second external channel so as to reduce heat transfer between the first medium flowing through the first half and the first medium flowing through the second half, the first half extending from the first inlet member to the first bent portion, the second half extending from the first bent portion to the first outlet member.

3. The heat exchanger according to claim 1, wherein the internal channel is defined by a wall having a corrugated or wavy cross-sectional shape.

4. A fuel cell system, comprising:
a fuel cell that generates power through electrochemical reaction of a fuel gas and air;
a combustion section that combusts an unused fuel gas that is not used in the power generation in the fuel cell to produce an exhaust gas; and
the heat exchanger according to claim 1 in which heat is exchanged between the air as the first medium and the exhaust gas as the second medium.

* * * * *